Dec. 2, 1924.

A. E. AYER 1,517,695

AUTOMATIC COUNTER MOLDING MACHINE

Original Filed Aug. 7, 1919    7 Sheets-Sheet 1

Inventor
Albert E. Ayer
by J.H. McCann, atty.

Dec. 2, 1924.
A. E. AYER
AUTOMATIC COUNTER MOLDING MACHINE
1,517,695
Original Filed Aug. 7, 1919    7 Sheets-Sheet 2
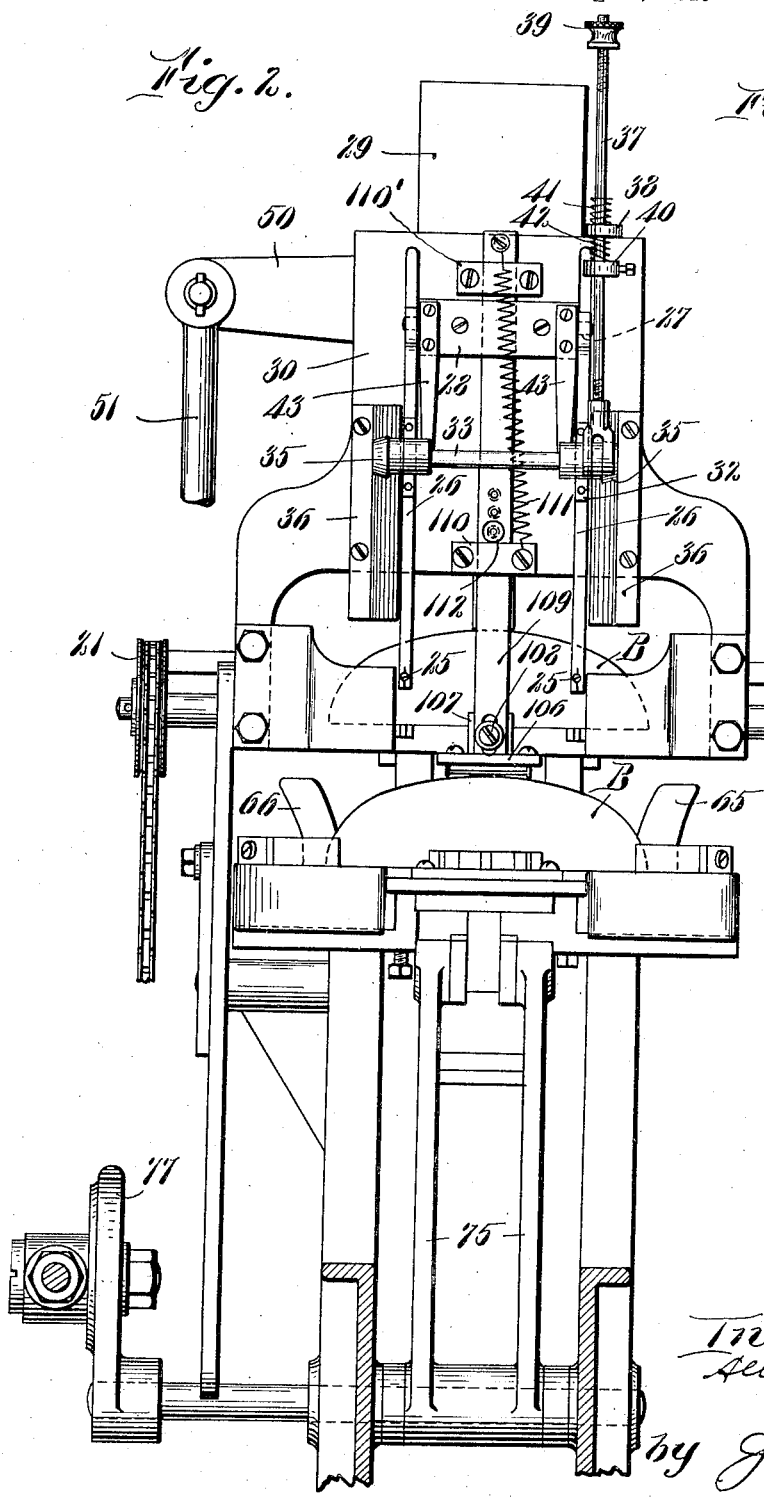

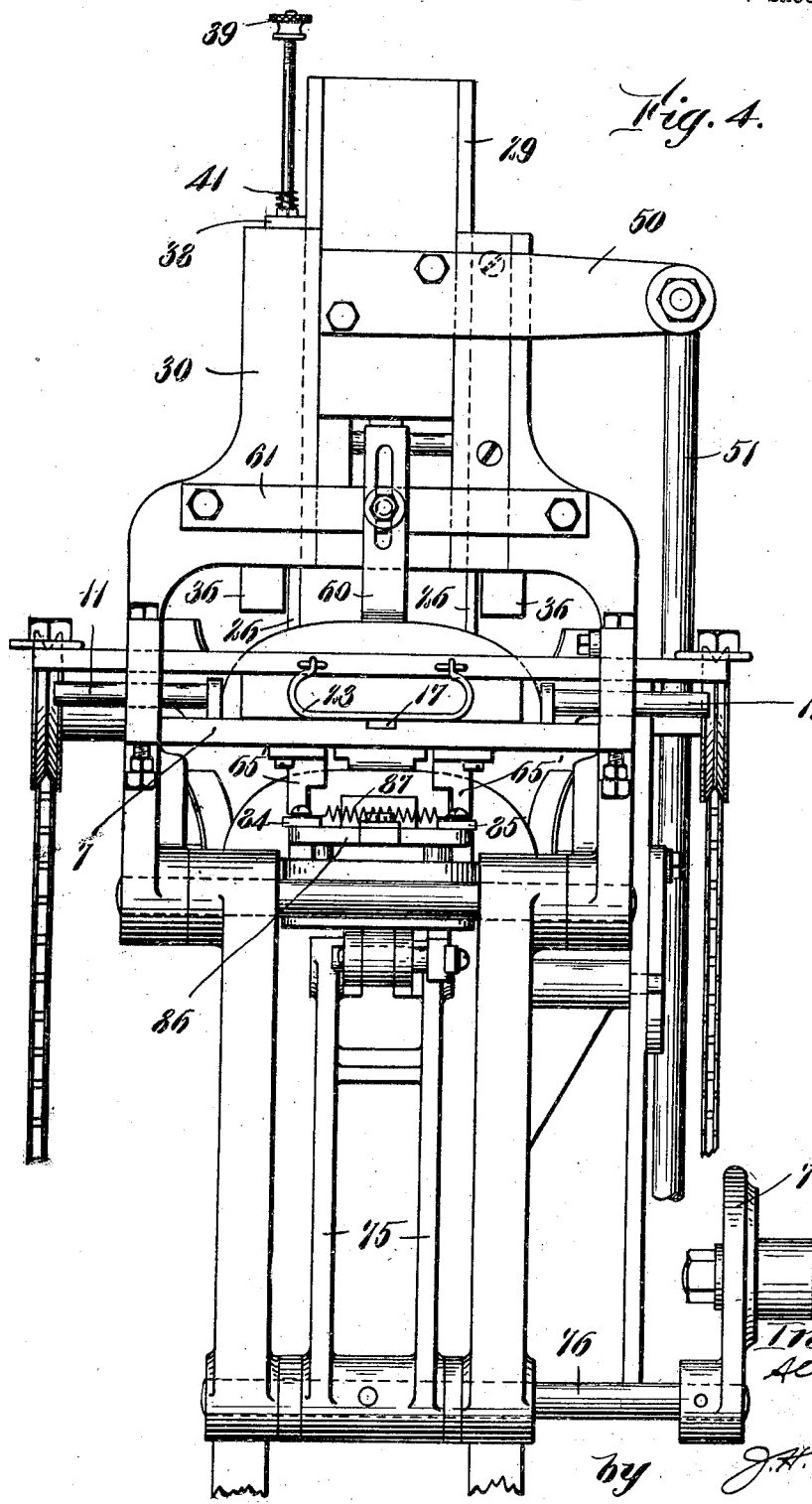

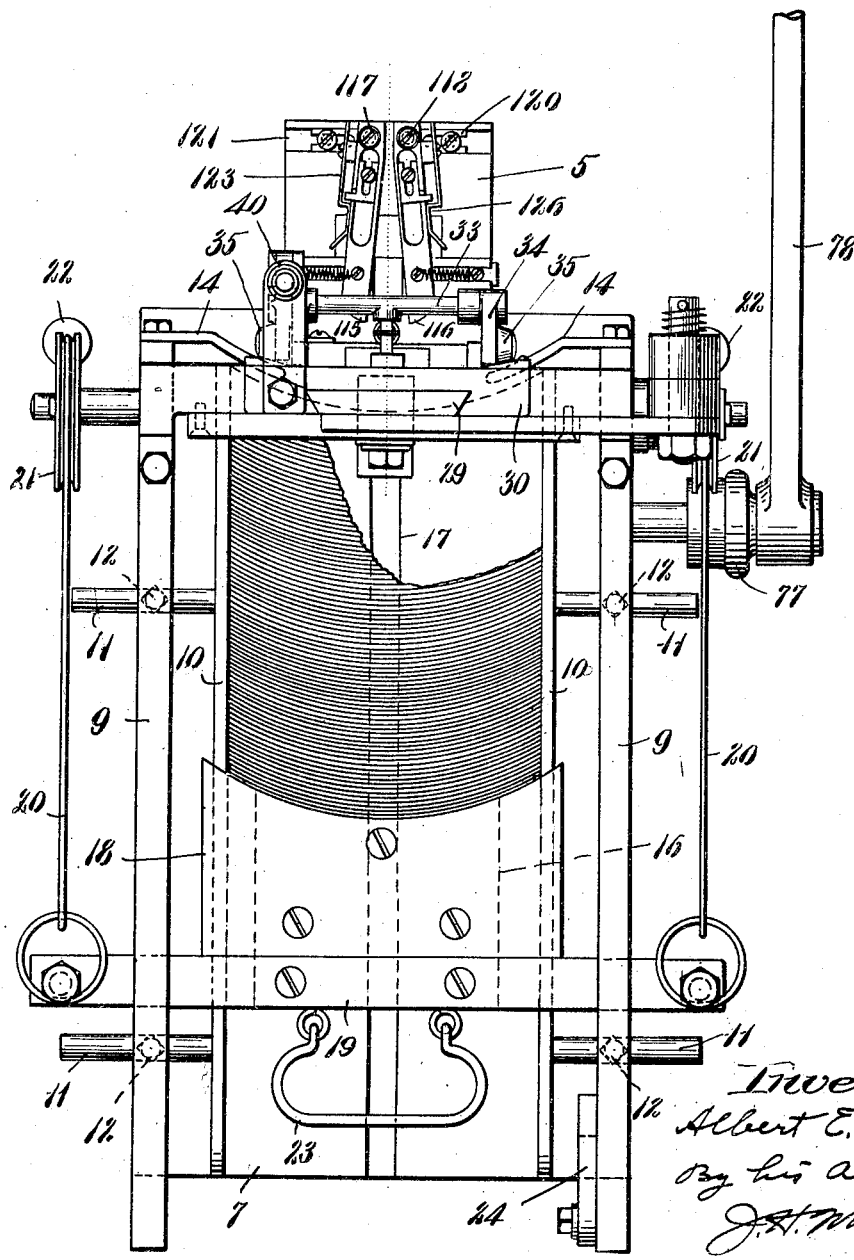

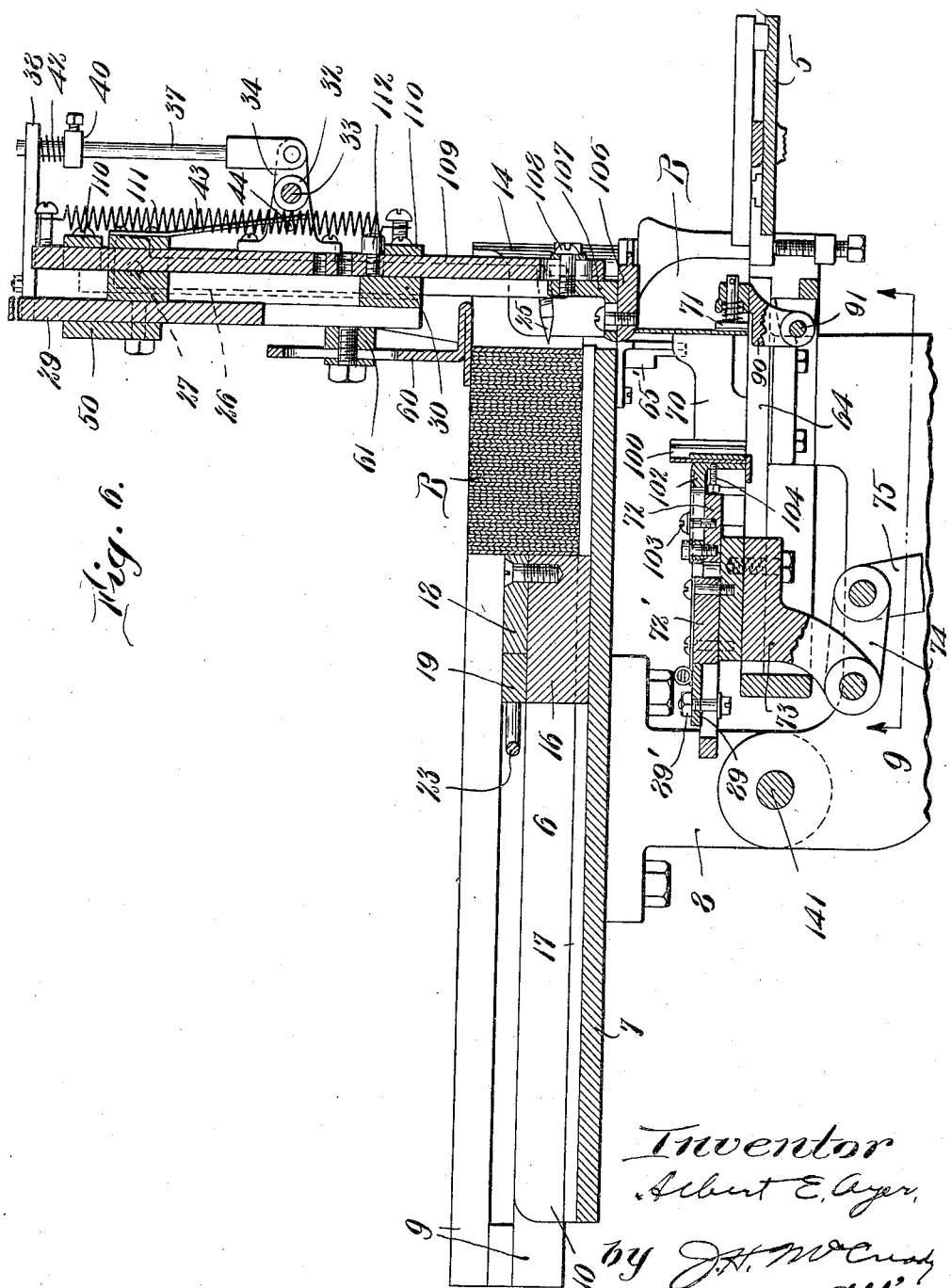

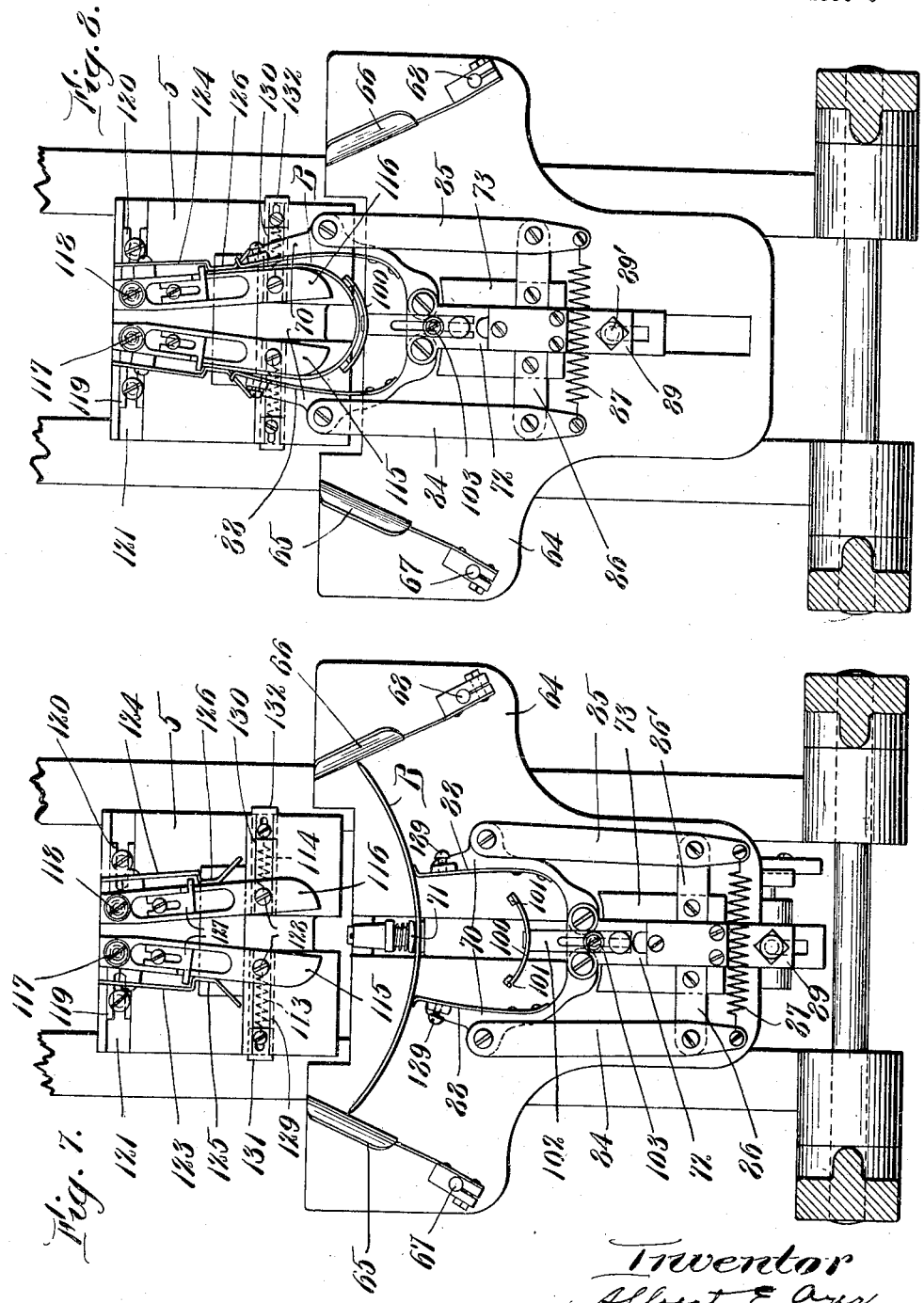

Dec. 2, 1924.
A. E. AYER
1,517,695
AUTOMATIC COUNTER MOLDING MACHINE
Original Filed Aug. 7, 1919    7 Sheets-Sheet 7
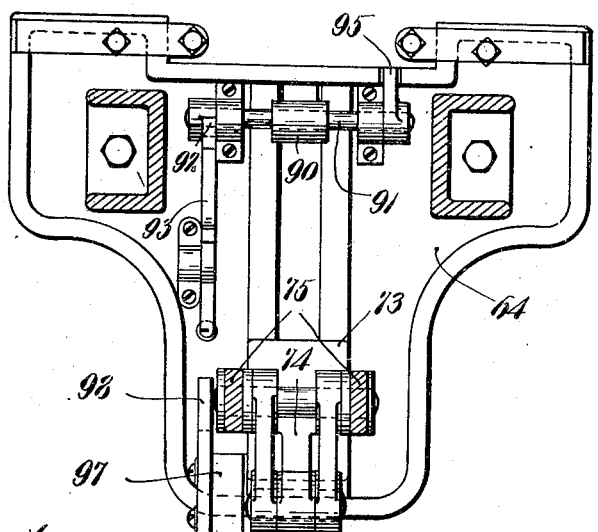
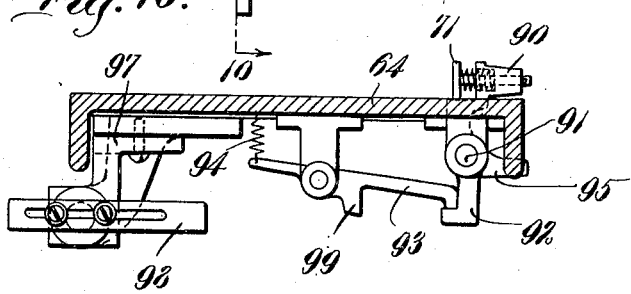
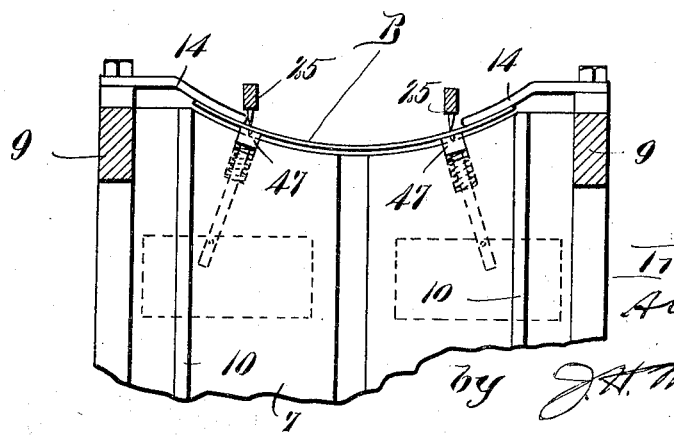

Patented Dec. 2, 1924.

1,517,695

UNITED STATES PATENT OFFICE.

ALBERT E. AYER, OF WINTHROP, MASSACHUSETTS, ASSIGNOR TO W. H. McELWAIN COMPANY, OF BOSTON, MASSACHUSETTS, A CORPORATION OF MASSACHUSETTS.

AUTOMATIC COUNTER-MOLDING MACHINE.

Application filed August 7, 1919, Serial No. 315,844. Renewed October 2, 1924.

*To all whom it may concern:*

Be it known that I, ALBERT E. AYER, a citizen of the United States, residing at Winthrop, in the county of Suffolk and State of Massachusetts, have invented certain Improvements in Automatic Counter-Molding Machines, of which the following description, in connection with the accompanying drawings, is a specification, like reference characters on the drawings indicating like parts in the several figures.

The present commercial process of manufacturing molded counters consists in providing a blank of suitable material, usually fibre board, the edges of this blank being skived or bevelled, running the blank through what is known as a rolling or "clam-shell" machine and then molding the blank. The rolling operation imparts to the blank both a longitudinal and a lateral curvature and it also corrugates the straight edge of the blank which later is to be crimped over to form the flange of the molded counter. In other words, the rolling operation effects a preliminary molding of the blank and prepares it for the final molding operation which is performed in a machine provided with suitable molds or dies. In performing the latter operation the rolled or clam-shelled blank is next bent into substantially a U-shape by the molding machine operator and is held in his fingers by its corrugated edge while he positions the blank between the molds of the molding machine. These molds then are operated by suitable mechanism to apply a very heavy pressure to the blank which conforms or shapes it to the contour of the molds, and while the molds hold the blank gripped between them a wiper plate turns over the projecting margin of the blank and forms the flange. The molds then open and release the counter.

This has been for many years the usual commercial process of manufacturing molded counters. A number of types of molding machines have been used although the machine known to the trade as the Stewart machine has been most commonly used and is today widely used. This machine must be fed by hand and since this operation requires considerable skill, it commands good wages. With a view to reducing the expense of making counters, a great many attempts have been made to produce a completely automatic counter molding machine; that is, one in which the counter blanks would be taken from a magazine and fed automatically to the molds of the molding machine and would then be removed or "doffed" from the molds automatically. The patented art shows many of these attempts and a considerable number of these machines have been built, but so far as I am aware none of these machines has proved successful commercially.

Within the last few years, however, semi-automatic machines have been developed which are provided with a holder in which the operator places the counter blank after first bending it into a U-shape. This holder is then moved automatically to present the blank that it carries to the molds, and after the molding operation has been completed, an automatic doffing mechanism removes the molded counter from the machine. These machines eliminate the skill required on the part of an operator to feed the hand-fed type of machine, but they still require one operator for each machine.

Among the difficulties encountered in the production of a completely automatic machine, is that introduced by the peculiar shape of clam-shell blanks due to their curvature, the great variety of sizes of blanks that must be handled, the peculiar character of the stock from which these blanks are made, and the fact that a machine to be commercially successful must be substantially fool-proof.

It is the general object of this invention to devise a completely automatic counter holding machine which will satisfy the practical requirements for a machine of this character.

The nature of the invention will be readily understood from the following description when read in connection with the accompanying drawings, in which—

Fig. 2 is a front elevation of the mechanism with which the present invention is more particularly concerned;

Fig. 3 is a side elevation of certain parts of this mechanism shown in Fig. 2;

Fig. 4 is a rear elevation of the mechanism shown in Fig. 2;

Fig. 5 is a plan view of the mechanism shown in Figs. 2 and 4;

Fig. 6 is a vertical cross sectional view of the mechanism shown in Figs. 2, 4 and 5;

Fig. 7 is a plan view of the mechanism that bends the counter blank and the holder into which the counter blank is forced;

Fig. 8 is a plan view similar to Fig. 7 but showing the parts in different positions;

Fig. 9 is a bottom view, partly in cross section, on the line 9—9, Fig. 6;

Fig. 10 is a cross sectional view on the line 10—10, Fig. 9;

Fig. 11 is a horizontal cross sectional view through a part of the magazine.

Figure 1:
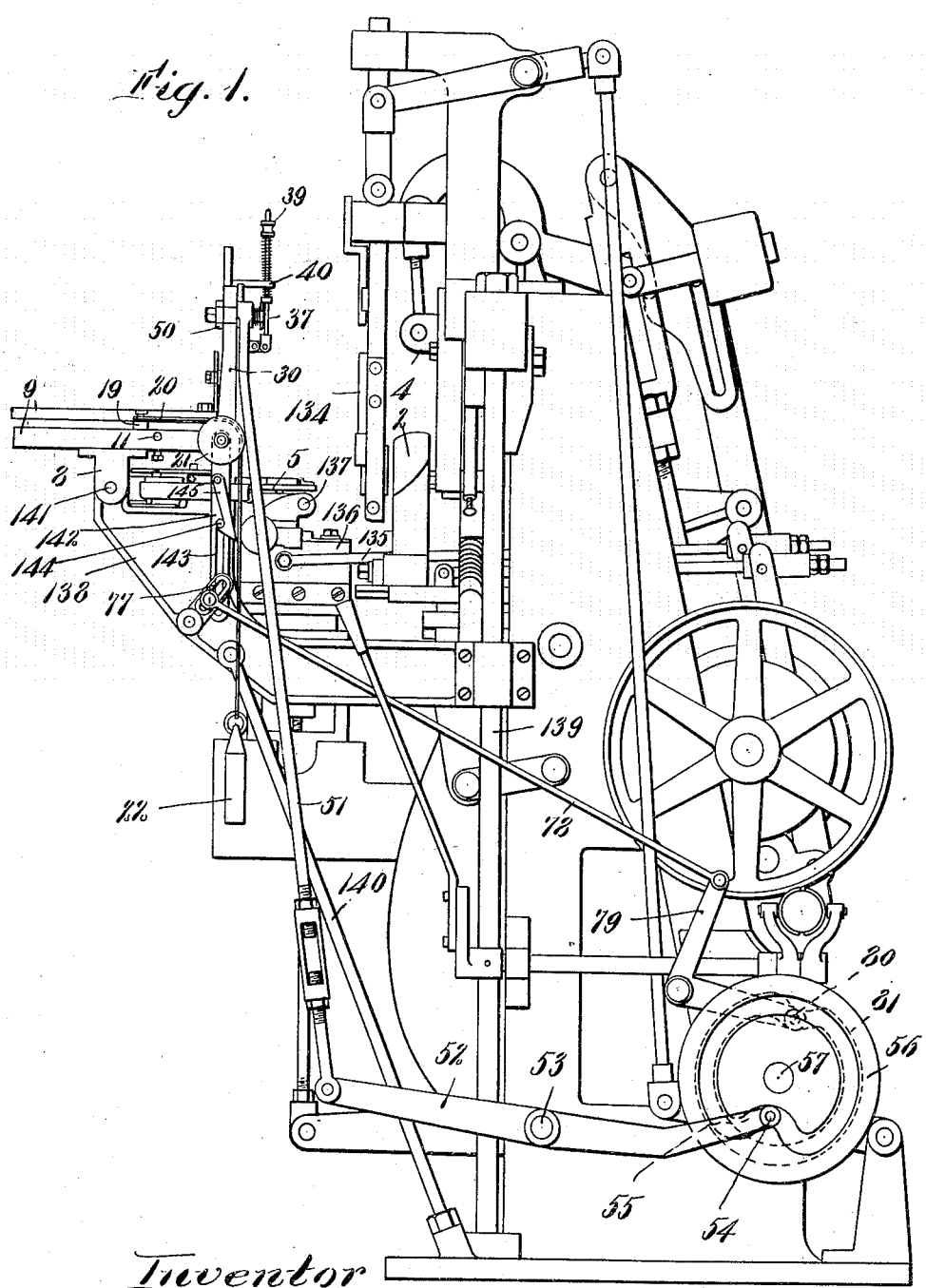
Figure 1 is a side elevation showing part of a counter molding machine equipped with a mechanism embodying the present invention.

The drawings show the invention as applied to a machine of the semi-automatic type to which reference has been made hereinbefore, the particular machine shown being that known in the trade as the Jacquemin machine and shown and described in Patent No. 1,332,259, dated March 2, 1920, although it will readily be understood that the invention can be applied to many forms of counter molding machines. The semi-automatic machines, as above stated, are provided with a holder in which the counter blank, after being bent into a U-shape, is placed, and which holds the blank while it is moved to present the blank to the molds. The molds are then operated to shape the counter, the wiper plate crimps over the flange, and an automatic doffing mechanism finally removes the counter from the molds which have opened in readiness to receive another counter blank.

The present invention provides a mechanism which, briefly stated, comprises a magazine in which the counter blanks are stacked, a separating mechanism for selecting blanks one at a time, and feeding them out of the magazine, and a bending mechanism to which the blanks are delivered by the separating mechanism and which operates to bend each blank into a U-shape and to place it in the counter holder of the Jacquemin machine. The machine then operates exactly as though it has been fed by hand.

Referring first to Fig. 1, 2 designates the center mold, 4 the wiper slide, and 5 the carrier for the counter holder of the Jacquemin machine shown in the patent above referred to. These parts are all constructed and operated as disclosed in said patent and reference should be made thereto for a detailed description of the construction and operation of this machine. The present invention provides a mechanism which automatically takes counter blanks from a magazine and delivers them to the holder supported by the carrier 5.

The counter blanks are of the general outline indicated at B, Fig. 2, but are curved longitudinally and also somewhat laterally. These blanks are stacked face to face, as clearly shown in Figs. 5 and 6, in a horizontal magazine indicated in general at 6. This magazine comprises a bottom 7, supported on a bracket 8, and two side pieces 9. Between the side pieces are mounted two adjustable side plates 10—10 each having a pair of pins 11—11 fixed thereto and projecting through holes formed in the side members 9. Set screws 12 arranged to bear against these pins secure the side plates 10 in their adjusted positions and enable the plates to be adjusted toward or from each other to accommodate blanks of different lengths.

At the forward or delivery end of the magazine abutment plates 14 are located, these plates being curved to conform to the longitudinal curvature of the blanks and being bolted securely to the forward ends of the side members 9. A follower backs up the stack of blanks and consists of a block 16, having a tongue that slides in a groove 17 formed in the upper surface of the bottom 7 of the magazine, and a plate 18 screwed to the upper surface of the block and wide enough to overlap the side plates 10—10 when these plates are adjusted in the positions in which they are shown in Fig. 5. A bar 19, also secured to the block 16, extends through slots in the opposite side members 9 and has two flexible cords or chains 20—20 connected to its opposite ends and running over pulleys 21—21. Each of these cords supports a weight 22 and this weight serves to draw the follower forward and press the stack of blanks against the abutment plates 14. In order to withdraw the follower whenever it is necessary to replenish the supply of blanks in the magazine a bail or handle 23 is pivoted to the bar 19 where it can be conveniently grasped by the operator. A gravity latch 24, pivoted to one of the side members 9, is arranged to engage the bar 19 and retain this bar, whenever desired, at the rearward limit of its movement.

The counter blanks are separated and fed edgewise out of the forward end of the magazine one at a time by means of a picker mechanism. This mechanism comprises two pickers 25—25, Figs. 2 and 6, respectively, mounted in the lower ends of picker bars 26—26. The bars are supported, respectively, on pivots 27—27 projecting from the opposite ends of a block 28 which is secured to a slide 29 mounted in vertical ways formed in a bracket 30 that forms part of the machine frame. Each picker carries a small bracket 32 bolted rigidly thereto and these two brackets form a bearing for a rock shaft 33. At opposite ends of this rock shaft are fixed two arms 34—34, carrying conical rolls 35—35 which run, respectively, on bevelled plates 36—36 secured to opposite sides of the bracket 30. A rod 37, Fig. 3, pivoted to one of the brackets 34, extends upwardly through a hole formed in a stationary plate 38 secured to the upper end of the bracket 30. A thumb screw 39 is adjustably threaded on the upper end of the rod 37 and a collar 40 is adjustably secured to this rod below the plate 38. Preferably light coiled springs 41 and 42, respectively, encircle the rod above and below the plate 38. Two flat springs 43—43 are secured to the block 28 and bear, respectively, against pins 44 (see Fig. 6) projecting from the brackets 32—32 which are rigidly secured to the picker bar 26.

Assuming now that the slide 29 is moving upwardly, it will be evident that the picker bars 26—26 must move upwardly with it. If the rocker arms 34—34 at this time are standing at right angles to the picker bar, they will hold the bars, and consequently the pickers, at a certain distance away from the face of the endmost blank in the magazine 6. Referring to Fig. 3 it will be seen that as the parts near the upper limit of their stroke the spring 42 will strike the lower side of the plate 38 and thus yieldingly prevent the rod 37 from being raised further. The slide 29, however, will continue to move upwardly for a short distance, thus carrying the rock shaft 33 with it, and this motion will swing the arms 34—34 into an inclined position, as shown in dotted lines in Fig. 3, and thus permit the springs 43 to move the picker bars and the pickers inwardly toward the face of the endmost blank in the magazine. The parts may be adjusted so that this operation will take place, as just described, or, if desired, the collar 40 and spring 42 may be omitted. In that event the arms 34—34 will remain in their straight positions until the slide 29 again starts downwardly. The springs 43 hold the rolls 35—35 with considerable pressure against the bevelled plates 36—36, and consequently as soon as the slide 29 and rock shaft 33 start to move downwardly, the rolls 35—35 tend to lag behind and they thus are turned into their inclined positions in the manner above described thus swinging the pickers inwardly. When the slide is at the upper part of its stroke the points of the pickers are immediately in front of the face of the endmost blank in the magazine, as shown, for instance, in Figs. 2 and 6. This inward movement of the pickers takes place very quickly, in fact with a snap, due to the action of the springs 43, and the result is to jab the points of the pickers 25—25 into the front face of the endmost blank B.

The next movement of the slide 29 is downward and during this movement the pickers carry the blank downwardly out of the magazine. When the pickers arrive at a point near the lower limit of their stroke, the thumb nut 39, Fig. 2, strikes the upper end of the spring 41 and yieldingly checks the downward movement of the rod 37. The slide, however, continues to move downwardly, carrying the pivot 33 with it, and thus moves the rocker arms 34—34 into their straightened or right angle positions again, swinging the pickers away from the face of the blank. Pins 45, Fig. 3, prevent movement of the rocker arms 34 beyond their right angle positions. When the slide 29 rises again the rocker arms 34—34 are still held in their straightened positions until they are tipped downwardly in the manner above described. This construction thus gives the pickers a fourway movement, returning them in a path in front of the path of their downward movement, and the change from one path to the other taking place at the top and bottom, respectively, of their stroke.

As the endmost blank is forced downwardly past the forward edge of the bottom 7 of the magazine, it is carried past two spring pressed plungers 47—47, Fig. 11, both mounted in the bottom 7 of the magazine so that they tend to close the space through which the blank is forced out of the magazine. The upper edges of these blocks are bevelled and they thus permit the passage of the endmost blank but prevent the next adjacent blank from being carried downwardly with it. The outward movement of these plungers is limited by a pin projecting laterally through the shank or tail piece of each plunger and the face of each plunger is grooved vertically, as clearly shown in Fig. 11, to provide a passageway through which the points of the pickers can travel in case the machine is operated when the magazine is empty. It is obvious that if it were not for these grooves the picker points might be broken if the machine were operated without counter blanks in the magazine.

For the purpose of giving the slide 29 the up and down movement above mentioned, it has an arm 50, Figs. 1 and 2, bolted thereto, and a connecting rod 51 is pivoted at one end to this arm and at its opposite end to a lever 52 fulcrumed on the machine frame at 53 and carrying a cam roll 54 running in a path 55 formed in a cam 56 fast on the cam shaft 57 of the machine. This shaft is driven at a suitable speed through gear connections with the main shaft to operate the pickers in the proper time relationship to the operation of the other mechanisms of the machine.

A T-shaped member 60 is adjustably bolted to a stationary bar 61, Figs. 4 and 6, so that its lower end lies parallel to and immediately above the upper edges of the foremost blanks in the magazine, and this member serves to prevent these blanks from being moved upwardly during the operation of the machine.

The picker mechanism above described carries the blanks downwardly one at a time into a bending mechanism, delivering the blanks on to a table 64, Fig. 6, over which the parts of the bending mechanism operate. During this downward movement the rearward surface of the blank is guided by two brackets 65'—65', Figs. 4 and 6, and the blank is delivered substantially in the position in which it is shown at B in Fig. 7. The ends of the blanks engage two plates 65 and 66 which flare away from each other, as indicated in Fig. 2, and which tend to hold the blank in a properly centered position with reference to the other parts of the mechanism. These two plates are secured, respectively, to split clamps which are supported on the respective posts 67 and 68, both fixed in the table 64. The plates thus can be angularly adjusted toward and from each other to accommodate blanks varying in length.

The blank bending operation is performed by two members, one consisting of a U-shaped plunger 70, Fig. 7, hereinafter referred to as the bender, and the other consisting of a stop or abutment 71. The bender comprises two arms which unite to form the U-shaped construction of this part, as clearly shown in Figs. 7 and 8, both of these arms being pivoted to the forward end of a slide 72. This slide is moved backward and forward by means of a bracket 73, Fig. 6, although the slide can also move to a limited extent with reference to the bracket. The bracket moves in a slot formed in the table 64 and is connected by a link 74 to the upper end of an arm 75 fast on a rock shaft 76 to which also is fixed an arm 77 that is connected by a link 78 to one end of a bell crank lever 79, the opposite end of which carries a roll 80 running in a cam path 81 formed in a cam fast on the shaft 57. The arm 77 is slotted, as shown in Fig. 1, so that the pivotal connection of the rod 78 can be adjusted to vary the effective length of the lever arm 77 and thus to vary the throw of the bender 70.

The two members of the bender 70, in addition to being pivoted to the forward end of the slide 72, are also pivoted, respectively, to the forward ends of lever arms 84 and 85, Fig. 7, which are fulcrumed on the opposite ends of arms 86 and 86' secured in the brackets 73, the rearward ends of these levers being connected by a coiled spring 87. This construction thus tends to hold the free ends of the arms of the bender separated but enables these arms to be moved inwardly toward each other. It will be seen from an inspection of Fig. 6 that the slide 72 is slotted to receive a block 72' that is secured to the bracket 73 and which allows the slide to have a limited backward and forward movement relatively to the bracket. The backward movement of the slide 72 relatively to the bracket is limited by the forward end of the slot striking the block 72' and the forward movement is limited by a plate 89 adjustably secured in the slot by the bolt 89'. As will be seen from an inspection of Fig. 7, the spring 87 acting through the arms 84 and 85 and the two parts of the bender 70 tends to move the slide 72 forward and this forward movement is limited by the plate 89 striking the rearward side of the block 72'.

The opposite arms of the bender 70 are each provided with a resilient plate or strip 88, the ends of which are out-turned to form the counter engaging face of the bender, and these strips are riveted to the arms and each having a set screw 189 bearing thereagainst by means of which they can be adjusted to make them absolutely even.

The bender bears against the back or rearward side of the counter blank B, while the abutment or stop 71 bears against the middle of the forward side of the blank at a point midway between the two points of contact of the bender with the blank. This stop comprises a spring pressed plunger, as best shown in Fig. 6, the plunger being carried in a head 90 which is secured fast on a rock shaft 91 mounted in suitable brackets secured to the bottom of the table 64. This construction is clearly shown in Figs. 9 and 10. Also secured fast on one end of the rock shaft 91 is a shouldered arm 92 with which the forward end of a dog 93 is normally held in engagement by means of a spring 94, the engagement between the dog and the arm 92 serving to hold the head 90 rigidly in the position in which it is shown in Fig. 10. Another arm 95, also secured to the rock shaft 91, engages a notch in one of the flanges of the table 64 and limits the extent to which the pivoted head 90 can swing in a counter clockwise direction, as the parts appear in Fig. 10.

When the bender 70 is moved forward the pressure of its two ends on the counter blank operates to bend this blank into a U-shape, the middle of the blank being held by the stop or abutment 71 during this operation. Immediately after the blank has been bent into this position the bender 70 is moved forward to carry the blank forward into the holder that is to deliver the blank to the molds of the machine. It is necessary for the purpose of this movement to move the abutment 71 out of the way and, to this end, there is fixed to a part of the bracket 73 another small bracket 97, Fig. 10, to which is adjustably secured a trip member 98 that is adapted to strike a part 99 on the dog 93 and raise the forward end of the dog to a point above the axis of the rock shaft 91. The trip 98 is adjusted so that this movement of the dog takes place after the counter blank has been bent but before the forward movement of the counter blank is begun. As soon as the dog 93 is moved into its upper position the weight of the abutment 71 and the part 90 which carries it causes both of these members to swing downwardly in a clockwise direction far enough to carry the stop 71 below the upper surface of the table 64.

While this operation is taking place a plunger 100 curved to fit the rear face of the bent blank B and preferably provided with friction strips 101 at its opposite ends, is brought into engagement with the rear surface of the blank. This plunger is mounted on the forward end of a slotted arm 102, Figs. 6 and 7, which is adjustably secured to the plunger 72 by a screw 103 and a guide pin, the plunger being prevented from moving backward by a thrust screw 104, Fig. 6. This plunger 100 operates through its engagement with the blank to push the blank forward over the surface of the table 64 and into the counter holder that is mounted on the plate or carrier 5. The blank is held in its bent position while it is pushed forward and the two legs of the blank are pushed into spring clamps with which the holder is provided.

During this movement there is some tendency for the curved end of the blank to tip upwardly, and in order to prevent this tendency a presser foot is mounted immediately over the upper edge of the blank. This presser foot comprises a plate 106, Figs. 2 and 6, mounted for backward and forward adjustment horizontally in the lower end of a small bracket 107. A screw 108 is threaded into the bracket and projects through a slot in the lower part of a slide 109 to which it adjustably secures this bracket. This slide is mounted in two guides 110—110 secured to the frame 30. A spring 111 connected at one end to the upper end of the slide 109 and at its opposite end to the lower bracket 110, tends to hold the slide 109 yieldingly at the downward limit of its stroke and this limit is determined by a stop screw 112 which can be adjusted in any one of a vertical series of holes formed in the slide 109.

It will be seen from an inspection of Fig. 6 that the plate 106 lies in a position to be engaged by the upper edge of a counter blank when it is bent into a U-shaped position by the bender 70. When the plunger 100 moves ahead to engage the rear end of the counter blank and push this blank forward into the counter blank holder, the rearward part of the blank moves under the plate 106 and the adjustment usually is such that this plate is lifted slightly by the blank. Consequently, any tendency of the blank to tip forward is effectually prevented by this plate or presser foot.

The counter holder shown comprises two arms 115 and 116, Figs. 7 and 8, pivoted on screws 117 and 118, respectively, which are threaded into slides 119 and 120, respectively, both mounted in a groove 121 cut in the plate 5 and secured in adjusted positions by screws. The arms each has a spring 123 and 124, respectively, secured to its outer side, these springs being each provided with inset portions 125 and 126 that bear against the outer sides of the respective arms 115 and 116. Immediately back of these inset portions the springs flare away from the arms.

It will be evident from an inspection of Fig. 7 that when the bender 70 bends the counter blank into a U-shape it will force the opposite legs of the counter blank against the outer surfaces of the arms 115 and 116; and when the plunger 100 moves the blank forward, these legs or forward edges of the counter blank will be forced forward between the inset portions of the springs and their respective arms into the position in which the blank B is shown in Fig. 8. In order to limit the point to which the counter blank is so moved, each of the arms 115 and 116 is provided with a breast gage. For this purpose the arms are each grooved in their upper surfaces to receive the breast gages 127, Fig. 7, each of these gages being provided with a projection lying immediately in front of the respective insets 125 and 126, and they are slotted and secured to the arm by screws so that they can be adjusted backward or forward, as desired.

To adjust the width of the rearward part of the holder the arms 115 and 116 each have a pivot screw 128—128 extending therethrough into plates 129 and 130, respectively, that slide in a dove-tail groove formed transversely in the carrier 5. These plates abut against additional plates 131 and 132, respectively, which are adjustably secured in stationary positions in the opposite ends of the groove. Two coiled springs 113 and 114 act on the arms 115 and 116, respectively, to separate the rearward ends of these arms, the movements of these parts under the influence of the springs being limited by the stop plates 131 and 132. This construction enables the edges of the counter blank to be moved toward each other while it is still held by the holder and while the molds are brought into gripping engagement with the counter.

Assuming that the counter blank has now been delivered to the holder, the bender 70 and the plunger 100 move backwardly to their original positions and the holder is next swung from its horizontal position, in which it has been during the time that the counter was placed in it, to a substantially vertical position, where it delivers the counter blank to the molds. The machine then operates in the same manner that it would if it had been fed by hand to mold the counter and finally to remove or doff the molded counter automatically by the doffing mechanism 134. As soon as the counter blank holder has delivered its counter to the molds it swings backwardly again to its horizontal position in readiness to receive the next counter blank.

In Fig. 1 the center mold 2 is shown in its forward position in front of the plane of the side molds where it is moved while the doffing operation is performed and the counter holder carrier 5 is shown in its horizontal position in readiness to receive a counter blank. A rod 135 operated by a cam moves the slide 136 forward at the proper time, and this movement operates through a cam secured to the carrier plate 5 to swing this plate and the holder parts mounted thereon about the pivot 137 into a vertical position. This sliding movement also carries the carrier forward far enough to place the counter blank between the molds, the center mold, in the meantime, having moved backward into the plane of the side molds. This operation takes place exactly as in the Jacquemin machine.

In order to support the parts of the separating and bending mechanism in the proper relationship to the counter holder and the other parts of the molding machine, a brake 138, Fig. 1, is provided of suitable design to sustain the various parts of the mechanism and this bracket is supported partly by being bolted to the stay rods 139 at the opposite sides of the machine, and partly by thrust rods 140 which are pivoted to the bracket 138 at opposite sides thereof and have their lower ends supported in the base of the machine.

In order to facilitate the making of repairs to the bending mechanism, the magazine and the parts mounted thereon, including the picker mechanism and its support 30, are all pivotally supported by the bracket 138. That is, the ears 8, Figs. 1 and 6, which project from the bottom of the magazine, are supported on a pivot 141 that is mounted in the bracket 138. A link 142, Fig. 1, is pivoted on the axis of one of the rolls 21 and has a slot 143 formed therein to receive a pin 144. A gravity latch 145 pivoted on the link 142 normally engages the pin 144 which projects from the bracket 138 and holds the magazine firmly in its operative position, as shown in Fig. 1. Whenever it is desired to make repairs, however, or to remove a jammed counter, the latch 145 is disengaged from the pin and the magazine, and the parts mounted thereon, are then tipped backwardly, the pin 144 sliding through the slot 143 during this movement until it reaches the end of the slot where it serves to hold the magazine in its tipped position.

It will be seen from an inspection of Fig. 8 that after the blank B has been bent and forced into the holder, there is a space between the rearward ends of the members 115 and 116 and the curved rear end of the bent counter blank. The plunger 100 moves forward somewhat farther than actually is necessary to push the blank into the holder, and this movement is of advantage in ensuring the location of the two ends of the counter blank against the breast gages 127. That is, if one leg or end of the blank should strike one of the gages 127 before the other end or leg strikes the corresponding stop, the continued forward movement of the plunger 100 will even up the ends by pushing forward the end that has not been brought into contact with its stop 127. This is an important function since it ensures the accurate adjustment of the ends of the blank in the counter holder and prevents the formation of "long-legged counters", which would result if the two ends of the blank were not evenly positioned in the holder.

The operation of the machine has been so completely described in connection with the foregoing description of construction that any further statement as to operation is believed to be unnecessary.

It will be evident that while I have herein shown the invention as applied to a machine of the semi-automatic type, this being the best embodiment of the invention which I have so far devised, the invention, nevertheless, is capable of embodiment in many other forms; and it is contemplated that a machine embodying this invention and organized for commercial manufacture might be designed on very different lines from those illustrated although still embodying the more essential features of this invention.

It is also contemplated that the separating mechanism might be used in other forms of machines for operating on counter blanks or articles of a similar nature.

The present invention involves certain novel features in common with my co-pending application Serial No. 513,910, filed November 9, 1921. The claims to this common subject matter are presented in the application above identified, the claims of the present case being restricted to those features which are not disclosed in my other application.

What is claimed as new is:

1. In a machine for operating on counter blanks, the combination of a magazine in which the blanks are stacked, pickers movable forward and backward in a path substantially parallel to the endmost blank in the magazine, operating mechanism for said pickers, including means for jabbing the pickers into the face of the endmost blank to enable the pickers to carry said blank forward with them out of the magazine, and a spring pressed plunger mounted opposite each of said pickers and tending to close the space through which the blank is forced out of the magazine, said plungers each having a groove formed therethrough in which the pickers can travel when the magazine is empty.

2. In an automatic counter molding machine, the combination of molding mechanism, a counter holder constructed to retain a blank bent into a U-shape, mechanism for moving said holder to present a blank held therein to said molding mechanism, a reciprocating bending mechanism movable toward and from said holder, and comprising a U-shaped member for bending the blanks and moving them toward said holder, and means for pushing the bent blanks out of said member into said holder.

3. In an automatic counter molding machine, the combination of a counter molding mechanism, a substantially horizontal magazine for holding a stack of counter blanks, mechanism for feeding said blanks one at a time downwardly out of said magazine, additional mechanism for delivering the blanks so fed to the molds of the counter molding machine, said additional mechanism including parts normally positioned under said magazine, and supporting means for said magazine enabling the magazine to be tipped out of its normal position to afford free access to said parts.

4. In an automatic counter molding machine having counter shaping molds, a mechanism for bending counter blanks preparatory to positioning them between the molds, said mechanism comprising an abutment positioned for engagement with one face of a counter blank, a bender arranged to engage the other face of said counter blank at opposite sides of the point of engagement therewith of said abutment, and means for relatively moving said abutment and bender to cause them to bend a counter blank into substantially a U-shape.

5. In an automatic counter molding machine, a bending mechanism comprising an abutment positioned for engagement with one face of a counter blank, a bender arranged to engage the other face of said counter blank at opposite sides of the point of engagement therewith of said abutment, means for relatively moving said abutment and bender to cause them to bend a counter blank, and means cooperating with said abutment to hold it rigidly in its blank bending position while the blank is being bent and thereafter enabling the abutment to move out of said blank bending position.

6. In an automatic counter molding machine, a bending mechanism comprising an abutment positioned for engagement with one face of a counter blank, a bender arranged to engage the other face of said counter blank at opposite sides of the point of engagement therewith of said abutment, means for moving said bender forward toward said abutment to bend the blank about the abutment, and supporting means cooperating with said abutment to hold it rigidly in its operative position during the first part of the forward movement of said bender, and thereafter enabling it to be moved out of the path of movement of said blank as the blank is carried forward.

7. In an automatic counter molding machine, a bending mechanism comprising an abutment positioned for engagement with one face of a counter blank, a bender arranged to engage the other face of said counter blank at opposite sides of the point of engagement therewith of said abutment, means for relatively moving said abutment and bender to cause them to bend a counter blank, and means for preventing said counter blank from tipping while it is being bent.

8. In an automatic counter molding machine, a bending mechanism comprising an abutment positioned for engagement with one face of a counter blank, a bender arranged to engage the other face of said counter blank at opposite sides of the point of engagement therewith of said abutment, means for moving said bender forward toward said abutment to bend the blank about the abutment, a table on which the counter blank is supported while it is being bent, and a presser device yieldingly engaging the upper edge of said counter blank to hold it on the table during said bending operation.

9. In an automatic counter molding machine, a bending mechanism comprising an abutment positioned for engagement with one face of a counter blank, a bender arranged to engage the other face of said counter blank at opposite sides of the point of engagement therewith of said abutment, means for moving said bender forward toward said abutment to bend the blank about the abutment, supporting means cooperating with said abutment to hold it rigidly in its operative position during the first part of the forward movement of said bender, operating mechanism for said bender and means operated by said operating mechanism at a predetermined point in the movement of said bender for tripping the supporting means for said abutment and enabling the abutment to be moved out of the path of said blank as the blank is carried forward.

10. In an automatic counter molding machine, a counter blank bending mechanism comprising a pivoted abutment mounted to engage one face of a counter blank, a bender arranged to engage the other face of said blank at opposite sides of the point of engagement therewith of said abutment, operating mechanism for moving said bender forward toward said abutment to bend the blank about the abutment, a latch mechanism cooperating with said abutment to hold it normally in its operative or blank bending position, and means arranged to be moved by said operating mechanism for tripping said latch at a predetermined point in the movement of said bender to enable said abutment to swing into an inoperative position out of the path of movement of said counter blank as the blank is moved forward.

11. In an automatic counter molding machine, the combination of molding mechanism, a counter blank holder constructed to retain a blank bent into a U-shape, mechanism for moving said holder to present a blank held therein to said molding mechanism, means for bending a counter blank into a U-shape preparatory to placing it in said holder, and means for pushing the bent blank out of said bending means into said holder.

12. In an automatic counter molding machine, the combination of counter molding mechanism and means for delivering counter blanks one at a time to said mechanism, said means including a bending mechanism comprising an abutment mounted for engagement with one face of a counter blank, a bender constructed to engage the other face of said counter blank at opposite sides of the point of engagement therewith of said abutment, means for relatively moving said abutment and bender to cause them to bend the counter blank into substantially a U-shape, and a plunger operative to engage the curved end of a blank so bent and to move it forward relatively to said bender.

13. In an automatic counter molding machine, the combination of vertically arranged counter shaping molds, mechanism for operating said molds, a substantially horizontal magazine for counter blanks to be molded, a counter holder, means for delivering counter blanks one at a time from said magazine to said holder, and mechanism for giving said holder a swinging movement to enable it to present a counter blank held therein to said molds.

14. In an automatic counter molding machine, the combination of molding mechanism, a counter blank holder constructed to engage the margin of a counter blank bent into a U-shape and to hold the blank through its engagement with said margin leaving the greater part of the blank projecting free of the holder, mechanism for moving said holder from a counter blank receiving position to a position in which it presents the blank held therein to said molding mechanism, a magazine for holding a supply of counter blanks to be molded, means for feeding the blanks out of said magazine one at a time, bending mechanism to which the blanks so fed are delivered and operative to bend a blank into substantially a U-shape, and means for acting on the blank so bent to move it into said holder.

In testimony whereof I have signed my name to this specification.

ALBERT E. AYER.